United States Patent [19]

Erickson

[11] Patent Number: 5,033,274
[45] Date of Patent: Jul. 23, 1991

[54] RECTIFICATION REFLUX BY LATENT HEAT EXCHANGE WITH PARTIALLY DEPRESSURIZED ABSORBENT

[76] Inventor: Donald C. Erickson, 1704 S. Harbor La., Annapolis, Md. 21401

[21] Appl. No.: 442,115

[22] Filed: Nov. 28, 1989

[51] Int. Cl.⁵ .............................................. F25B 15/00
[52] U.S. Cl. ........................................ 62/476; 62/101; 62/495
[58] Field of Search .......................... 62/495, 476, 101

[56] References Cited

U.S. PATENT DOCUMENTS

| | | | |
|---|---|---|---|
| 3,140,591 | 7/1964 | Brown, Jr. et al. | 62/495 |
| 3,641,784 | 2/1972 | Schlichtig | 62/495 X |
| 4,573,330 | 3/1986 | von der Sluys et al. | 62/495 X |
| 4,691,528 | 9/1987 | Tongu | 62/495 X |
| 4,901,540 | 2/1990 | Houghton et al. | 62/495 |

Primary Examiner—Lloyd L. King

[57] ABSTRACT

Apparatus and process are disclosed for increasing the efficiency of thermally powered absorption heat pumps which use volatile absorbents. The improvement reduces rectification losses in absorption cycles having at least two generators operating at different pressures. In FIG. 1, the rectifier (7) for the higher pressure generator (1) is refluxed at least in part by exchanging latent heat (9) between rectifier vapor and absorbent solution at the approximate pressure of the lower pressure generator.

15 Claims, 4 Drawing Sheets

RECTIFICATION REFLUX BY LATENT HEAT EXCHANGE WITH PARTIALLY DEPRESSURIZED ABSORBENT

DESCRIPTION

1. Technical Field

This invention relates to continuous closed cycle heat pumps based on the absorptive principle, i.e., wherein a condensable working fluid is successively absorbed into and desorbed out of a circulating absorbent solution. The improvement described herein reduces the rectification losses associated with volatile absorbents. It applies to all known types of absorption heat pumps: residential and commercial space heating and cooling types, industrial refrigeration and industrial heat pumping, cryogenic refrigeration, and heat or cold storage.

2. Background

Absorption heat pumps (AHP) and absorption refrigeration systems use the principle of "boiling point elevation" (also equivalently known as "vapor pressure lowering") to pump heat from a lower to a higher temperature (a "lift"), using as the motive power a "drop" (decrease in temperature) of another quantity of heat. The absorption working pair (a mixture of absorbent plus a condensable working fluid or refrigerant) exhibits the boiling point elevation relative to the boiling point of the pure working fluid at the same pressure.

A highly significant characteristic of any absorption working pair (also called the absorbent solution) is the relative volatility of the absorbent compared to that of the working fluid. Although in principle no absorbent is completely nonvolatile, some, such as the inorganic salts, (e.g., alkali halides and alkali nitrates) and alkali hydroxides are effectively nonvolatile. The practical result is that the vaporous fluid desorbed from the absorbent solution comprised of such an absorbent contains at most several parts per million (ppm) quantities of absorbent, and much of that is due to liquid phase entrainment vice vapor phase presence.

In contrast, when the boiling temperature of the absorbent is within about 200 Kelvins or less of that of the working fluid, the desorbed vapor may contain significant quantities of vapor-phase absorbent. The higher the boiling point elevation (and hence lift), the greater the concentration of absorbent vapor. If the mixture containing trace quantities of absorbent is condensed and routed to the evaporator, problems can arise. The vapor leaving the evaporator is relatively pure working fluid, and the absorbent concentrates in the residual liquid. As the absorbent concentration increases, the boiling point elevation increases, making it more difficult to achieve the desired low evaporator temperature. The problem commences when the absorbent concentration in the vapor is a few tenths of a percent; and becomes quite severe above about 5%.

The prior art has dealt with this problem in several ways. One way is to provide a rectification column to purify the desorbed vapor to any desired level of purity. The vapor is contacted with a liquid having an equilibrium vapor composition which is more pure than the desorbed vapor. The contact is normally effected within a zone of counter-current vapor-liquid contact, with gas fed at bottom and liquid at top, i.e., a rectifier. As the liquid flows down the column by gravity it is enriched in absorbent content, and as the vapor flows upward, it is enriched in the more volatile component, i.e., the working fluid. The zone of counter-current contact permits multiple theoretical stages of contact, whereby each fluid phase can become more enriched than is possible from a single contact.

The implementation of a rectification step is further characterized by the source of the reflux liquid. Historically, part of the desorbed vapor has been condensed by external cooling (before, during or after rectification) and then returned as reflux. Originally the rectifier was uninsulated and thus received the cooling directly. When that cooling is insufficient, a reflux condenser may be provided either as part of or separate from the primary condenser. Also cooling coils may be mounted directly in the rectifier. The coils may be part of a pump-around loop from an external source of cooling, e.g., as disclosed in U.S. Pat. No. 4,706,464. It should be emphasized that any external cooling applied to produce reflux causes a one-for-one increase in generator duty and a corresponding decrease in cycle COP.

The reflux can preferably be produced by heating fluids internal to the cycle, and when properly done much of the above loss can be avoided. A minor fraction of the absorbent liquid enroute to the generator is frequently circulated in heat exchange coils in the rectifier, e.g., as disclosed in U.S. Pat. Nos. 4,706,464 and 3,552,142. The liquid so circulated can be from the primary absorber or a small, colder auxiliary absorber, U.S. Pat. No. 4,776,176. Although an improvement over reflux from external cooling, these techniques have the problems that only a limited amount of cooling is available from useful heating of internal liquids, and that a source of cooling much colder than that for the primary absorber is normally not available.

Co-pending application Ser. No. 418,163 filed by Donald C. Erickson on Oct. 6, 1989 discloses another way in which rectification losses of volatile absorbents can be reduced: by generating the reflux necessary for the rectification in an "enrichment" or "reverse distillation" column. The reflux generated in that manner does not decrease cycle COP, as happens when external cooling generates the reflux. One drawback with the enrichment column technique is that with forward cycles, i.e., when the condenser is at a higher pressure than the evaporator, a pump is necessary to increase the pressure of the reflux liquid to the rectifier pressure. In some cycles, a pump is already present, e.g., in a double-concentration-effect cycle. Many other advanced cycles do not otherwise include the necessary pump. The needed reflux pump would typically be a low-flow, high-head pump, which is characteristically a problematic type of pump.

What is needed, and included among the objects of this invention, is a means of refluxing the rectification step of an absorption heat pump using a volatile absorbent, which:

- does not produce the reflux by external cooling;
- produces more reflux than is possible from sensible heating of internal working fluids; and
- does not require a separate reflux pump.

DISCLOSURE OF INVENTION

The above and other useful objectives are attained by providing apparatus and/or process for pumping heat using thermal driving force which uses an absorption working pair comprised of a condensable working fluid and a volatile absorbent, wherein the improvement comprises: exchanging latent heat between rectifier vapor and absorbent solution which is at a lower pressure and temperature than said rectifier vapor. The exchange of latent heat inherently entails condensation of at least part of the rectifier vapor, thus yielding the desired reflux; and also desorption of vapor from the lower pressure absorbent solution. The various embodiments of this invention are distinguished by the source of the absorbent solution which is subjected to the latent heat exchange, and also by the destination of the desorbed lower pressure vapor. The absorbent solution may be at least part of the same solution which is desorbed to supply the vapor being rectified, either before desorption, or during, or after desorption. Alternatively it could be another solution, e.g., at a completely different concentration. The lower pressure vapor may be either condensed or absorbed, and each of those destinations may respectively entail an intervening rectification or enrichment treatment.

In essence, the rectifier is cooled (and thereby refluxed) by a mini-generator at reduced pressure.

BEST MODE FOR CARRYING OUT THE INVENTION

Figure 1:
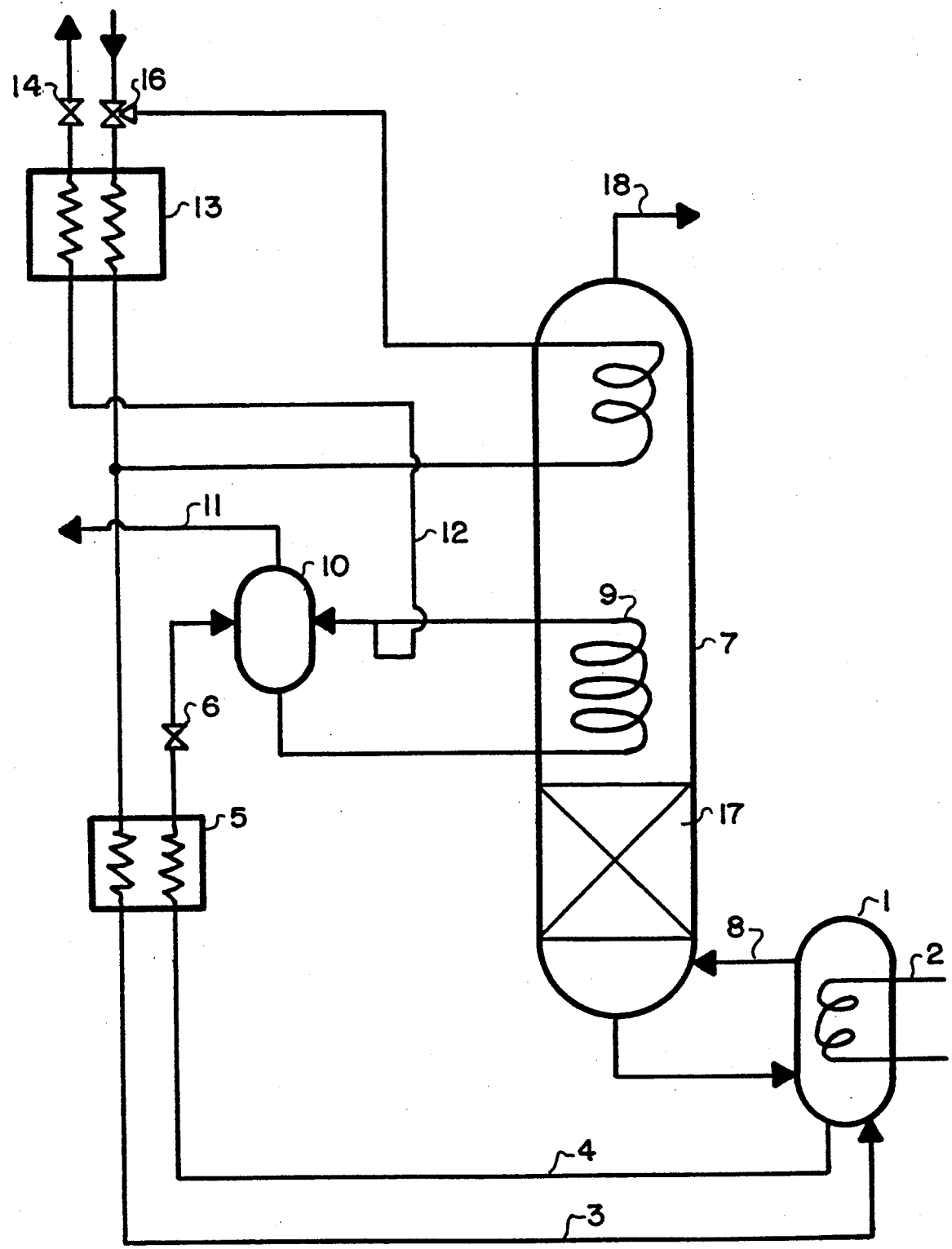
FIG. 1 is a schematic flowsheet of the key components of the disclosed improvement in isolation, i.e., without reference to a specific absorption cycle.

Referring to FIG. 1, one preferred embodiment of the disclosed improvement is illustrated wherein the lower pressure absorbent solution which receives latent heat from condensing rectifier vapor is the same absorbent as that which supplies vapor to the rectifier being refluxed. The lower pressure latent heat exchange occurs after the high pressure desorption. Generator 1 is heated by an external supply of heat 2 so as to desorb high pressure vapor from absorbent solution supplied through conduit 3. The partially desorbed absorbent solution is withdrawn via conduit 4, subcooled by sensible heat exchange with incoming absorbent in heat exchanger 5, and reduced in pressure via means for pressure reduction 6 (e.g., a valve, orifice, capillary, or the like). The partially depressurized absorbent solution is then contacted in latent heat exchange relationship with vapor of rectifier 7. Rectifier 7 is fed vapor from generator 1 via conduit 8. The latent heat exchanger 9 may be located internal to rectifier 7 as shown, or externally, as is known in the rectification art. Preferably the latent heat exchange is conducted in a recirculating percolating apparatus including phase separator 10, so as to ensure good heat and mass transfer. Desorbed vapor at lower pressure is removed via conduit 11, and absorbent solution is removed via conduit 12 for additional subcooling in heat exchanger 13 and further pressure reduction in valve 14. Rectifier 7 is preferably additionally comprised of sensible heat exchanger 15 which provides additional reflux while heating a portion of the incoming absorbent solution as determined by flow splitter 16, and also comprised of adiabatic counter-current vapor liquid contact section 17. Rectified high pressure vapor is withdrawn via conduit 18.

Figure 2:
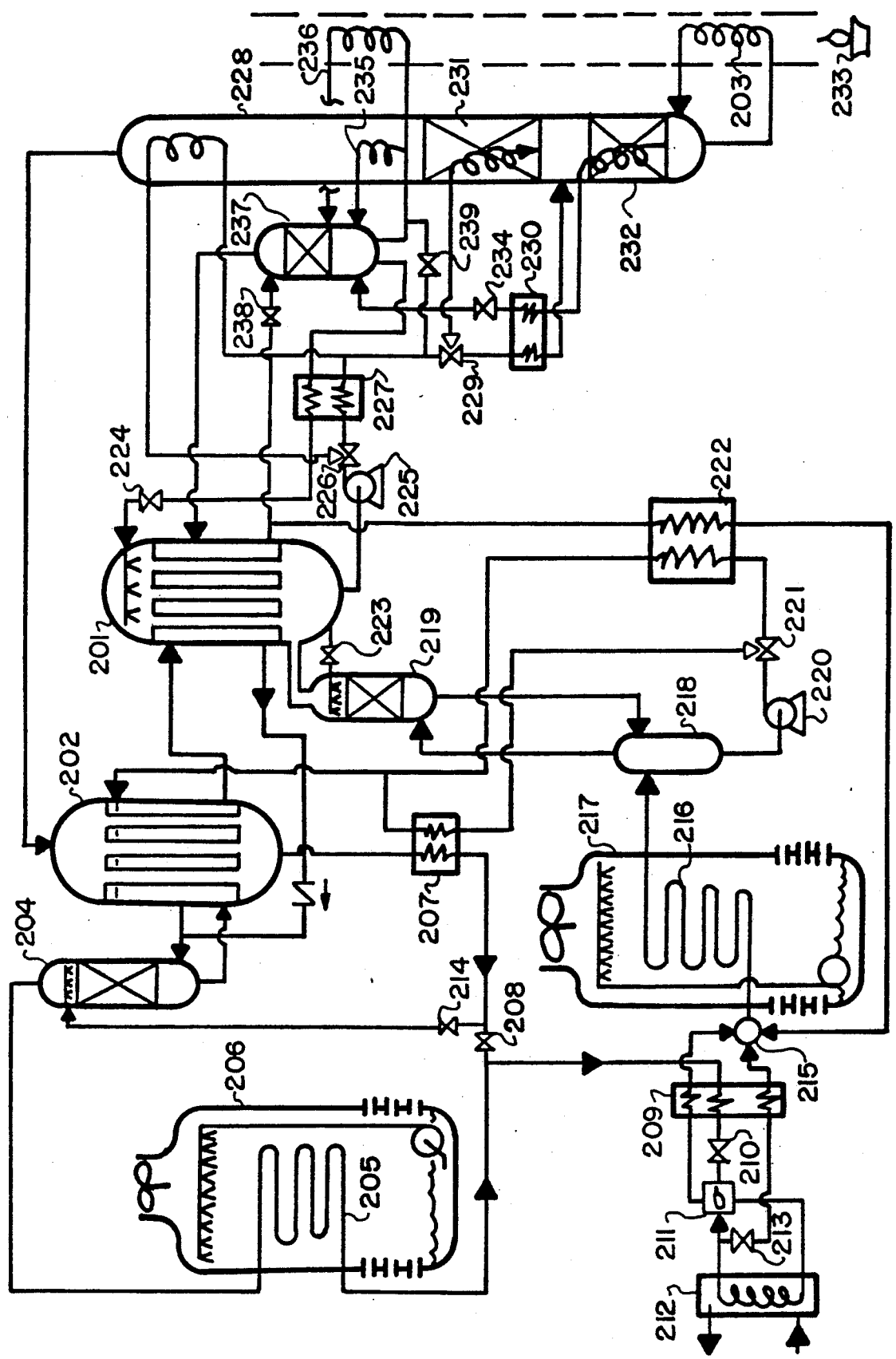
FIG. 2 illustrates the application of the disclosed improvement to a triple effect absorption cycle.

Referring to FIG. 2, a triple effect cycle is depicted, in which both absorber 201 and condenser 202 of high pressure generator 203 supply latent heat to the lower pressure generator. The lower pressure generator is comprised of the shell sides of vessels 201 and 202, and the combined vapor desorbed from those two sections is rectified in rectifier 204 and condensed in condenser 205, which is preferably cooled by evaporative cooler 206. High pressure condensate is subcooled by subcooler 207, reduced in pressure by valve 208, further subcooled together with lower pressure condensate in subcooler 209, and reduced to evaporator pressure by valve 210. The depressurized (lowest pressure) condensate is circulated through evaporator 212, which may include phase separator 211 which may also incorporate a float for controlling valve 210. Residual liquid is bled from the evaporator circuit by valve 213 and used to subcool incoming liquid in subcooler 209, along with the evaporated vapor. Some of the condensate refluxes rectifier 204 via valve 214. Evaporated vapor is routed to absorber 216 via distribution manifold 215, which ensures equal distribution of vapor and absorbent liquid into a multiplicity of parallel conduits, preferably in churn or slug flow regime. The conduits are preferably evaporatively cooled in ambient cooler 217 (for the air conditioning application of the technology). Phase separator 218 passes remaining unevaporated vapor to enrichment column 219, and absorbent solution to pump 220. Flow splitter 221 proportions the solution between sensible heat exchangers 207 and 222 for optimal heat recovery before delivery to the lower pressure generator comprised of two sections previously described.

The vapor enroute to higher temperature absorber 201 is enriched in absorbent vapor content to nearer the equilibrium prevailing in the absorber by countercurrent contact with liquid absorbent in enrichment column 219. The liquid absorbent is supplied to column 219 by control valve 223. Absorbent solution from control valve 224 absorbs the resulting vapor, and the resulting liquid is raised to high pressure by pump 225. Flow splitter 226 causes the pressurized liquid to provide sensible cooling to both rectifier 228 and heat exchanger 227. A second flow splitter 229 performs a similar function for heat exchanger 230 and another section 231 of rectifier 228. The heated absorbent solution is then introduced to the top of stripping section 232, which is in communication with high pressure generator 203, and externally heated by a source of heat 233. After desorption, the absorbent liquid is sensibly cooled both in stripping section 232 and in heat exchanger 230, then depressurized by valve 234 to the approximate pressure of condenser 205. The latent heat exchange with rectifier 228 vapor occurs in heat exchanger 235. The partially depressurized absorbent may also advantageously be used to extract more heat from the hot exhaust of heat source 233, via heat exchanger 236. The partially evaporated absorbent solution is returned to vessel 237, where the vapor is rectified, using as reflux part of the absorbent solution from the low pressure generator via valve 238. The rectified lower pressure vapor is then joined with vapor from the lower pressure generator for additional rectification in rectifier 204 and eventual condensation in condenser 205.

Thus the existence in this cycle of a lower pressure condenser 205 makes it possible to reflux rectifier 228 by latent heat exchange with partially depressurized absorbent solution from its own generator 203. By conducting the lower pressure latent heat exchange after the high pressure generation, vice before, no separate reflux pump is required. Alternatively the latent heat exchange could be conducted in parallel with (during)

generation by feeding coil 235 from valve 239, and still not require a separate reflux pump.

Figure 3:
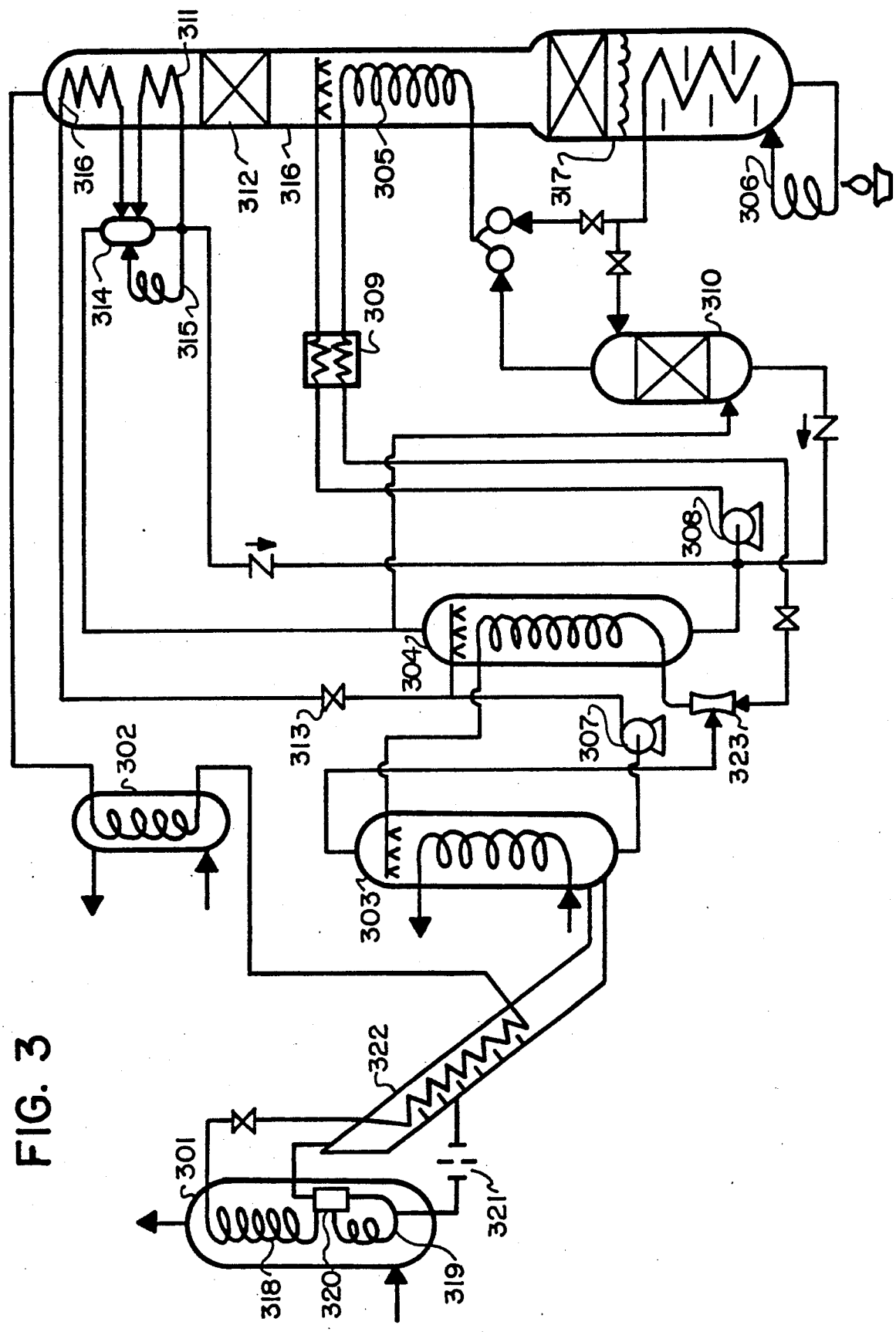
FIG. 3 to a variable effect absorption cycle.

Referring to FIG. 3, a "variable effect" cycle is depicted based upon the disclosure of U.S. Pat. No. 4,442,677. In the variable effect cycle, the absorbent solution is circulated sequentially through three generators at successively higher temperatures, and then through three absorbers at successively lower temperatures. The lowest temperature generator and highest temperature absorber operate at a common intermediate pressure, with transfer of vapor from that generator to that absorber. The hottest absorber supplies latent heat to the mid-temperature generator, and the mid-temperature absorber supplies heat to the coldest generator. External heat is supplied to the hottest generator, and external cooling to the coldest absorber. The condenser and evaporator are standard components.

FIG. 3 is a schematic flowsheet depicting evaporator 301, condenser 302, low temperature absorber 303, low temperature generator/mid-temperature absorber 304, mid-temperature generator/high temperature absorber 305, and high temperature generator 306, arranged in the standard sequence. Pump 307 raises the absorbent solution pressure to the intermediate pressure, and pump 308 further increases it to the high pressure of the two hotter generators. Solution sensible heat exchange is preferably provided for in heat exchanger 309.

If an absorption working pair having a volatile absorbent, such as $NH_3$—$H_2O$, is used in the variable effect cycle, two problems are encountered. First, the absorbent solution in generator 305 is more concentrated ("strong") than that in generator 304, and hence the desorbed vapor contains more absorbent, requiring more rectification reflux. Secondly, the vapor desorbed from generator 304 is substantially different in composition from vapor in equilibrium with the absorbent solution in absorber 305. To solve the latter problem, enrichment column 310 is incorporated to appropriately adjust the vapor equilibrium. To solve the reflux problem without adding a reflux pump or using external cooling, latent heat exchanger 311 is incorporated in rectifier 312, together with absorbent solution supply valve 313 and phase separator 314. As previously disclosed, coil 315 can advantageously be provided to extract more heat from hot exhaust gas. Also heat exchanger 316 can provide additional reflux via sensible heat exchange.

Thus once again the existence of a lower pressure vapor sink (absorber 305) makes it possible to reflux the high pressure rectifier with lower pressure absorbent solution. In this instance it is absorbent solution enroute to low temperature generator 304; some is bypassed to latent heat exchanger 311. The vapor from both latent heat exchangers is combined, enriched in column 310, and then absorbed in mid-pressure absorber 305. Vessel 316 is depicted as housing several different components, including rectifier 312, generator/absorber 305, and stripper 317; obviously they could alternatively be contained in separate communicating vessels.

Other novelties depicted in FIG. 3 include the evaporator arrangement, comprised of downward vapor flow section 318, percolating vapor flow section 319, phase separator 320, residual liquid bleed 321, and condensate subcooler 322. Also novel is the absorber configuration, including low-pressure-drop falling film absorber 303 which enriches the vapor enroute to high-pressure-drop churn or slug flow absorber 304, and jet ejector 323 to compensate for the pressure drop. Absorbers 304 and 305 are configured in upward churn/slug flow to permit efficient counter-current latent heat transfer to their accompanying falling film generator.

Figure 4:
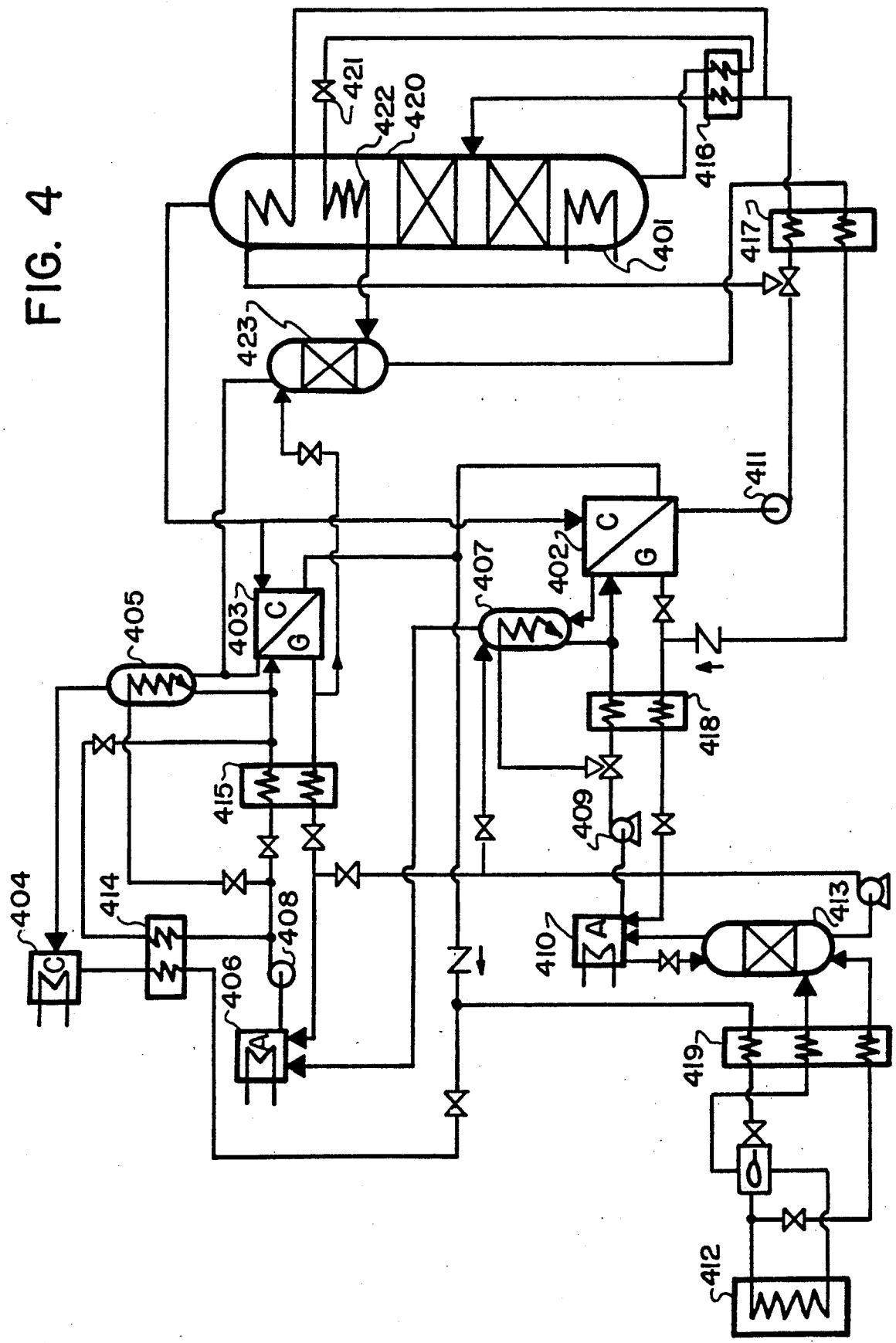
FIG. 4 to a 1.5 effect absorption cycle.

Referring to FIG. 4, a 1.5 effect cycle is depicted wherein the primary heat is theoretically used one and a half times in the cycle (as compared to twice in double effect, three times in triple effect, etc.). This cycle is used when the available generator temperature is substantially hotter than what is necessary to drive a single effect cycle, but not hot enough to drive a double effect cycle.

Like the variable effect cycle, the 1.5 effect cycle has three generators, with only the hottest being heated externally and the other two heated by latent heat exchange with internal fluids. In the FIG. 4 embodiment of the 1.5 effect cycle, vapor from high temperature, high pressure generator 401 is distributed to two condensers, 402 and 403, the former heating a low pressure generator and the latter heating an intermediate-pressure generator with a less concentrated ("weaker") absorbent solution. Vapor from generator 403 is condensed in condenser 404 after rectification in rectifier 405. Vapor from generator 402 is absorbed into absorber 406 after rectification in rectifier 407. The weaker absorbent solution is circulated in a closed loop between absorber 406 and generator 403 via pump 408. Pump 409 similarly circulates absorbent solution between absorber 410 and generator 402. Pump 411 circulates part of that same absorbent solution on to externally heated generator 401. Condensate from condenser 401 is evaporated in evaporator 412, and then absorbed in absorber 410. Enrichment column 413 favorably adjusts the vapor composition and provides reflux for rectifier 407. Standard sensible heat exchangers such as 414–419 may be present. High pressure rectifier 420 may be housed in the same vessel as generator 401. The key novelty disclosed is the technique of refluxing the high pressure rectifier using absorbent solution partially depressurized by valve 421 to the approximate pressure of condenser 404, then routed to latent heat exchanger 422, and thence to phase separator and rectifier 423. Rectifier 423 is refluxed by some of the weaker solution pressurized by pump 408.

FIGS. 2–4 are not intended to be exhaustive of the types of absorption cycles which would benefit from the lower pressure latent heat exchange refluxing technique, but merely indicative. The common features are the need for high pressure reflux, that is, use of a volatile absorbent; and the existence of a lower pressure sink (destination) for desorbed vapor. Under those conditions, it will always be possible to beneficially reflux the rectifier and desorb lower pressure vapor by latent heat exchange.

Any known volatile absorbents will benefit from this invention. Preferred absorption working pairs are comprised of at least one of $NH_3$ and monomethylamine as working fluid, and at least one of $H_2O$, di-normal butylamine, octylamine, di-isobutylamine, and butanediol as absorbent.

FIG. 3 is advantageously adapted as a residential or small-scale commercial heat pump for both heating and cooling occupied spaces. FIG. 4 is advantageously adapted to provide industrial refrigeration at temperatures on the order of $-35°$ C. at a high Coefficient of Performance: 0.8. In all three figures, with an ambient-cooled condenser at 35° C. and $NH_3$—$H_2O$ as the absorption working pair, the following approximate operating conditions would prevail. In FIG. 2, the high pressure generator would be at 200° C. and 4120 kPa, and the reflux latent heat exchanger at 143° C. and 1360 kPa for a 0° C. evaporator. In FIG. 3, with the high pressure generator at 180° C. and 1360 kPa, the reflux latent heat exchanger is at about 102° C. and 860 kPa. In FIG. 4, with the high pressure generator at 195° C. and 4480 kPa, the reflux latent heat exchanger is at about 133° C. and 1360 kPa.

I claim:

1. An apparatus for desorbing and rectifying a vaporous working fluid from an absorbent solution which is comprised of said working fluid and a volatile absorbent, comprised of:
   (a) a generator comprised of a means for heat exchange between said absorbent solution and an external source of heat;
   (b) a rectifier comprised of a means for latent heat exchange;
   (c) a means for fluid communication between said generator and said rectifier;
   (d) a means for supplying at least part of said absorbent solution to said means for latent heat exchange;
   (e) a means for withdrawing rectified vaporous working fluid from said rectifier;
   (f) a means for withdrawing additional vaporous working fluid from said means for latent heat exchange, and
   (g) a means for controlling the pressure of the absorbent solution in said means for latent heat exchange at a lower value than the pressure of said absorbent solution in said generator.

2. The apparatus according to claim 1 additionally comprised of a means for controlling the pressure of the absorbent solution in said means for latent heat exchange at a lower value than the pressure of said absorbent solution in said generator.

3. The apparatus according to claim 1 additionally comprised of a condenser in vapor communication with said rectifier and at least one of a separate condenser and an absorber in vapor communication with said means for latent heat exchange.

4. The apparatus according to claim 1 additionally comprised of a means for reducing the pressure of the absorbent solution from said generator and a conduit connecting said means for pressure reduction and said means for latent heat exchange.

5. A process for rectifying a vapor desorbed from an absorbent solution, which is circulated in a continuous closed loop, comprising:
   (a) reducing the pressure of at least part of said absorbent solution;
   (b) exchanging latent heat from part of said desorbed vapor to said reduced pressure absorbent solution; and
   (c) rectifying the remaining desorbed vapor by refluxing it with the condensate from part (b).

6. In an absorption cycle apparatus which is designed, dimensioned, and adapted to transfer heat from a heat source at a lower temperature to a heat sink at a higher temperature, and which is comprised of a higher pressure generator and a lower pressure generator, the improvement comprising:
   (a) a rectifier;
   (b) a means for fluid communication between said rectifier and said higher pressure generator;
   (c) a means for latent heat exchange between vapor of said rectifier and a liquid absorbent solution;
   (d) a means for vapor removal from said lower pressure generator;
   (e) a means for vapor removal from the liquid absorbent solution side of said means for latent heat exchange; and
   (f) a means for vapor communication between said respective means for vapor removal.

7. The apparatus according to claim 6 additionally comprised of a separate rectifier for the vapor generated in said means for latent heat exchange.

8. The apparatus according to claim 7 additionally comprised of a second separate rectifier for the combined vapor flow from said lower pressure generator and from said means for latent heat exchange.

9. The apparatus according to claim 6 additionally comprising:
   (a) a first absorbent circulation loop for said higher pressure generator;
   (b) a second absorbent circulation loop for said lower pressure generator; and
   (c) a conduit for supplying liquid absorbent solution from said first loop to said means for latent heat exchange.

10. The apparatus according to claim 6 additionally comprising:
    (a) a first absorbent circulation loop for said higher pressure generator;
    (b) a second absorbent circulation loop for said lower pressure generator; and
    (c) a conduit for supplying liquid absorbent solution from said second loop to said means for latent heat exchange.

11. The apparatus according to claim 1 additionally comprised of a pump and conduit for transporting absorbent solution from said means for latent heat exchange to said generator.

12. The apparatus according to claim 1 additionally comprised of a common supply conduit to and a common return conduit from said means for latent heat exchange and said generator.

13. The apparatus according to claim 1 additionally comprised of:
    (a) an absorber which receives absorbent solution from said generator;
    (b) a second generator which is heated by said absorber and
    (c) which is in vapor communication with said means for latent heat exchange.

14. The apparatus according to claim 13 additionally comprised of at least one of two conduits, said first conduit connecting absorbent solution effluent from said absorber via a means for increasing pressure to the inlet of said means for latent heat exchange; and said second conduit connecting absorbent solution effluent from said means for latent heat exchange via a means for reducing pressure to the inlet of said absorber.

15. The process according to claim 5 adapted for at least one of useful heating and cooling, and additionally comprised of:
    (a) condensing said rectified vapor at a first pressure;
    (b) desorbing a second vapor from a second absorbent solution at a second pressure lower than said first pressure by heating it with said condensing vapor;
    (c) condensing said second vapor to provide part of said useful heat; and
    (d) evaporating the condensate from steps (a) and (c) to provide said useful cooling.

* * * * *